United States Patent [19]
Richter

[11] Patent Number: 6,073,901
[45] Date of Patent: Jun. 13, 2000

[54] DEVICE FOR SUPPORTING OBJECTS

[76] Inventor: Herbert Richter, Drosselweg 8, 75331 Engelbrand, Germany

[21] Appl. No.: 09/280,936

[22] Filed: Mar. 29, 1999

[51] Int. Cl.$^7$ .................................................. A47G 1/10
[52] U.S. Cl. ................ 248/316.4; 224/558; 248/231.41; 248/346.07; 379/454; 379/455
[58] Field of Search ........................... 248/316.4, 346.07, 248/316.2, 231.41, 316.1; 379/455, 454, 426, 446, 448; 224/558, 929, 524, 523

[56] References Cited

U.S. PATENT DOCUMENTS

| | | | |
|---|---|---|---|
| 5,305,381 | 4/1994 | Wang et al. | 379/455 |
| 5,457,745 | 10/1995 | Wang | 379/454 |
| 5,555,302 | 9/1996 | Wang | 379/446 |
| 5,615,258 | 3/1997 | Ho | 379/428 |
| 5,788,202 | 8/1998 | Richter | 248/316.4 |
| 5,836,563 | 11/1998 | Hsin-Yung | 248/316.4 |
| 5,903,645 | 5/1999 | Tsay | 379/455 |
| 5,982,885 | 11/1999 | Ho | 379/446 |

*Primary Examiner*—Ramon O. Ramirez
*Assistant Examiner*—Tan Le
*Attorney, Agent, or Firm*—Klaus J. Bach

[57] ABSTRACT

A supporting device for supporting objects, particularly for supprting a telephone in a vehicle, comprising a pair of clamping wall structures at least one of which is movable and has restraining means disposed thereon, and a base body supporting the clamping wall structures and including restraining means which coact with the restraining means on the or each movable clamping wall structure so as to exert upon the latter a restraining force larger than the force exerted upon the clamping wall structures by the object clamped therebetween.

11 Claims, 5 Drawing Sheets

DEVICE FOR SUPPORTING OBJECTS

BACKGROUND OF THE INVENTION

This invention relates generally to a device for supporting objects and, more particularly, to a device for temporarily supporting a portable object, such as a mobile or cellular telephone, in a vehicle.

U.S. Pat. No. 5,788,202 discloses a supporting device of this type which comprises two clamping wall structures, at least one of which is movable to different clamping positions against the action of spring means, and means for releasably retaining the or each movable clamping wall structure in the clamping position to which it has been moved. In this prior-art arrangement, the retaining means comprise a rotatable member which is operatively connected to the movable clamping wall structure(s) in a manner causing rectilinear movement thereof to be translated into rotational movement of the rotatable member, a rotatable locking element joined to the rotatable member for rotation therewith, a latching means normally in engagement with the locking element to prevent rotation thereof under the action of said spring means, a release member operable to disengage the latching means from the locking element, thereby to enable the spring means to retract the movable clamping wall structure(s) from the clamping position thereof.

The present invention has for its principal objective to provide a supporting device which is of simpler construction and more economical to make yet is also reliable in its operation.

SUMMARY OF THE INVENTION

The invention accordingly provides a supporting device comprising a base body, a pair of clamping wall structures for temporarily holding in place an object clamped therebetween, at least one of the clamping wall structures being movable to different clamping positions, and means for releaseably retaining the or each movable clamping wall structure in the position to which it is moved, wherein the retaining means comprise first restraining means disposed on the movable clamping wall structure(s), and second restraining means disposed in the base body and coacting with the first restraining means so as to exert upon the movable clamping wall structure(s) a predetermined restraining force permitting manual movement thereof but which restraining force exceeds the force exerted upon the clamping wall structure(s) by the object clamped therebetween.

This arrangement will allow the movable clamping wall structure(s) to be manually moved to and from the various clamping positions, and, upon cessation of the manual actuating force, will become effective to retain the moved clamping wall structure(s) in the desired clamping position without the aid of any special latching or locking mechanism.

Preferably, the first and second restraining means are serrations arrayed on the movable clamping wall structure(s) and in the base body, respectively, so as to ride upon each during movement of the movable clamping wall structure(s). Conceivably, other means, such as, for example, friction surfaces or the like, may be found suitable for use as restraining means performing the desired function.

Preferably, the restraining means associated with the movable clamping wall structure(s) or, as preferred, those associated with the base body are disposed on elastic or flexible means, such as flexible finger elements, to facilitate relative movement between the first and second restraining means.

The clamping wall structures are generally L-shaped, one of them including a slide plate which defines a glide channel, and the other clamping wall structure including a slide plate which is slideably lodged in the glide channel. The restraining means associated with the movable clamping wall structure(s) are disposed on the slide plate(s) thereof The restraining means associated with the base body may be disposed on surface portions of the latter or, as is preferred, on a separate insert supported in the base body so as to enable the restraining means thereon co-act with the restraining means associated with the movable clamping wall structure(s). Preferably, the insert is provided with flexible finger elements formed integral with the insert. The advantage to be derived from this feature resides in that such an insert enables base bodies designed for use with other supporting devices, such as the one described in the aforesaid U.S. Pat. No. 5,788,202, for example, to be readily adapted for use in accordance with the teachings of the present invention. It will be appreciated that this will result in substantial savings in terms of tooling costs. Conventional supporting devices employing a latching mechanism and a release element associated therewith require their base body to be provided with an opening for the release element to extend therethrough. Since such an opening is not needed if the base body is to be used in accordance with the present invention, the insert including the aforesaid restraining means preferably is provided with a closure member adapted, when the insert is utilized with a base body including a release-element opening, to block and substantially close the latter.

The invention will become more readily apparent from the following description of a preferred embodiment thereof described, by way of example only, with reference to the accompanying drawings.

Figure 1:
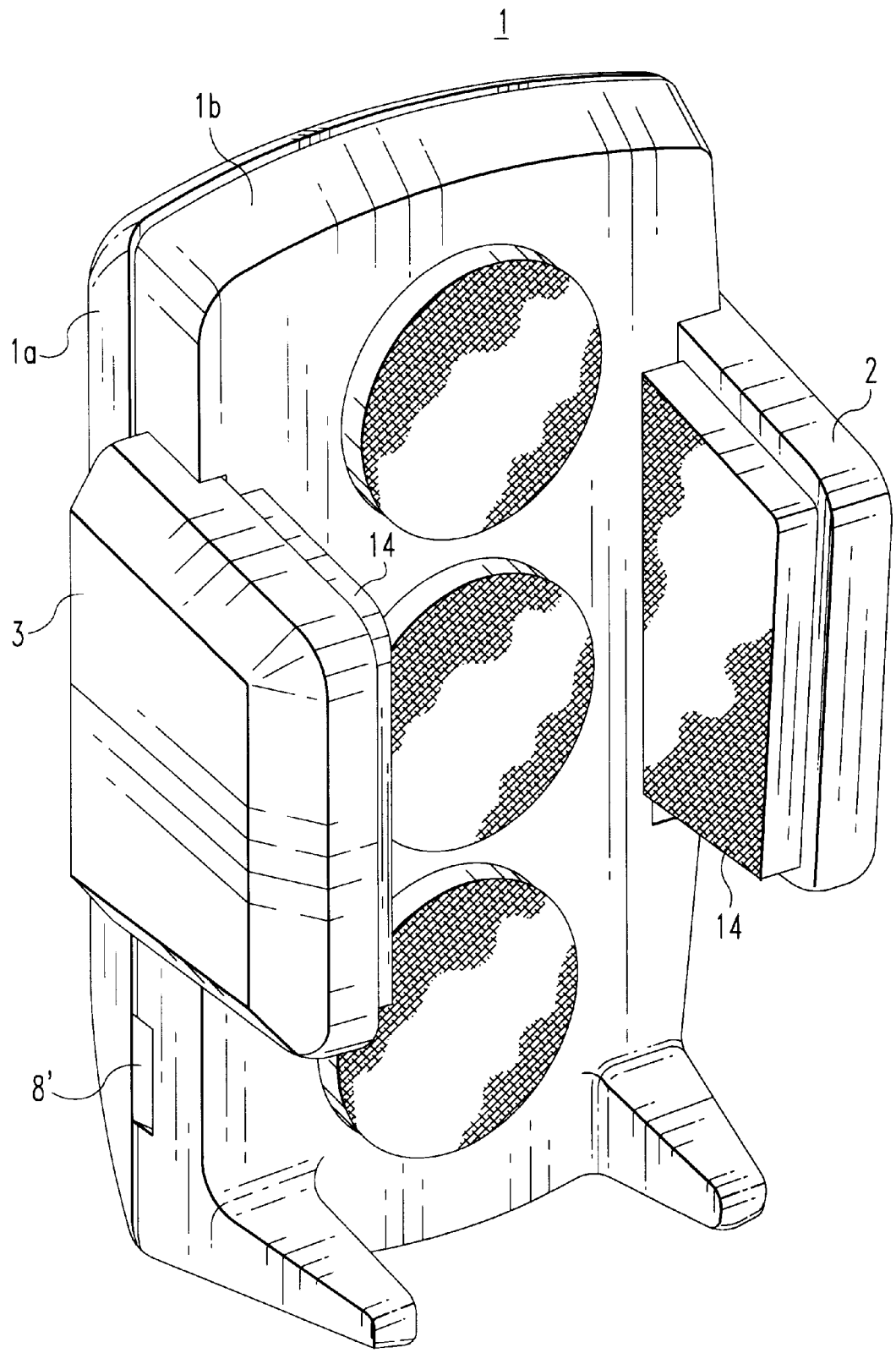
FIG. 1 is a perspective view of the supporting device embodying the invention.

Referring now to the drawings, the supporting device as shown in FIG. 1 comprises basically a base body 1 having a bottom part 1a and a cover part 1b suitably fastened together, for example, by means of screws (not shown), and a pair of clamping wall structures 2 and 3 at least one of which is movable to different clamping positions. The clamping surfaces of the clamping wall structures 2, 3 and outer surface portions of the cover part 1b have disposed thereon elastic pads 14 designed to aid in holding the object being supported firmly in place. The pads may consist of any suitable material, such as, for example, foam rubber having a thickness of about 4 millimeters.

Figure 2:
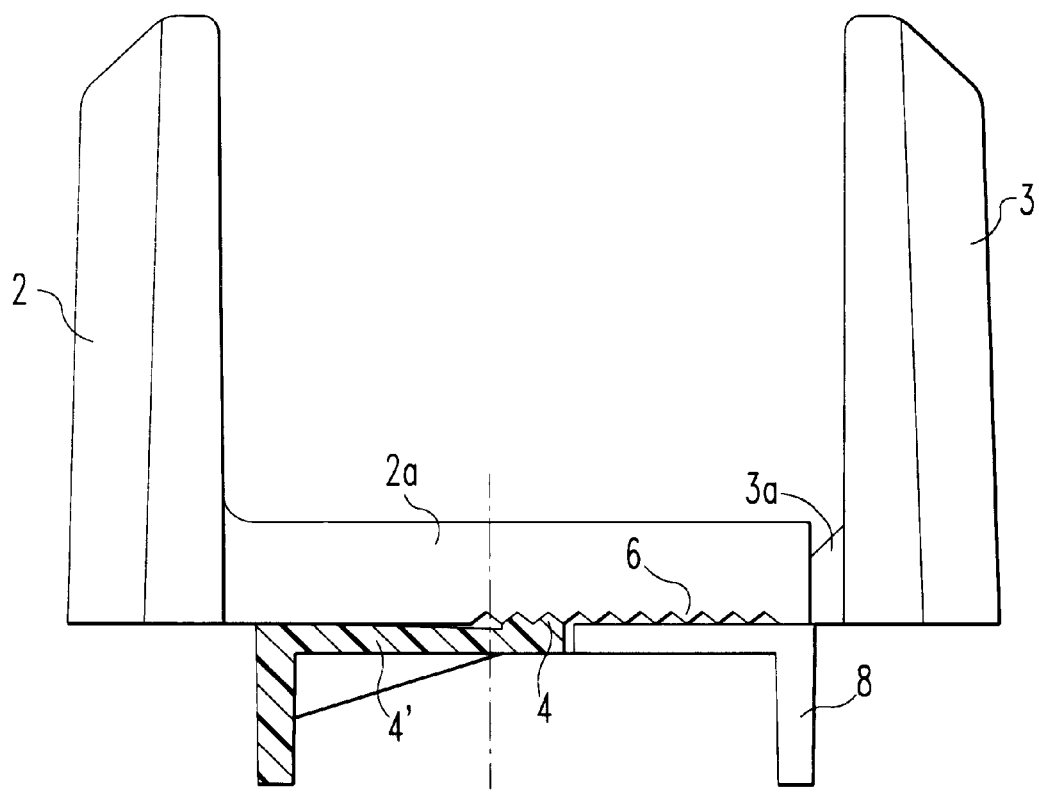
FIG. 2 is an end view showing, partly in section, the clamping wall structures and the insert of the supporting device.
Figure 3:
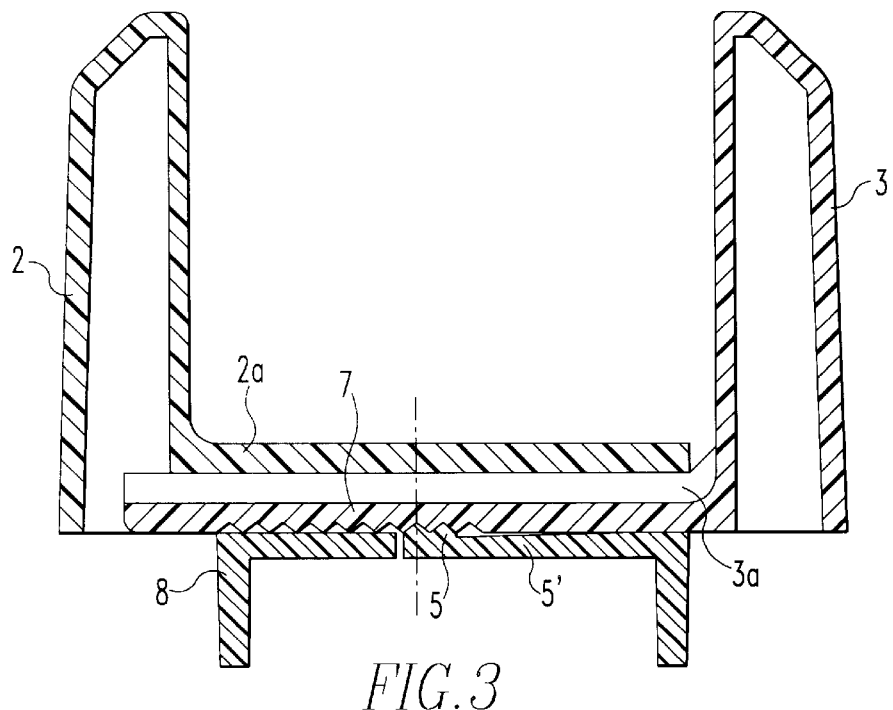
FIG. 3 is a view similar to FIG. 2 but taken along line III—III of FIG. 4.
Figure 4:
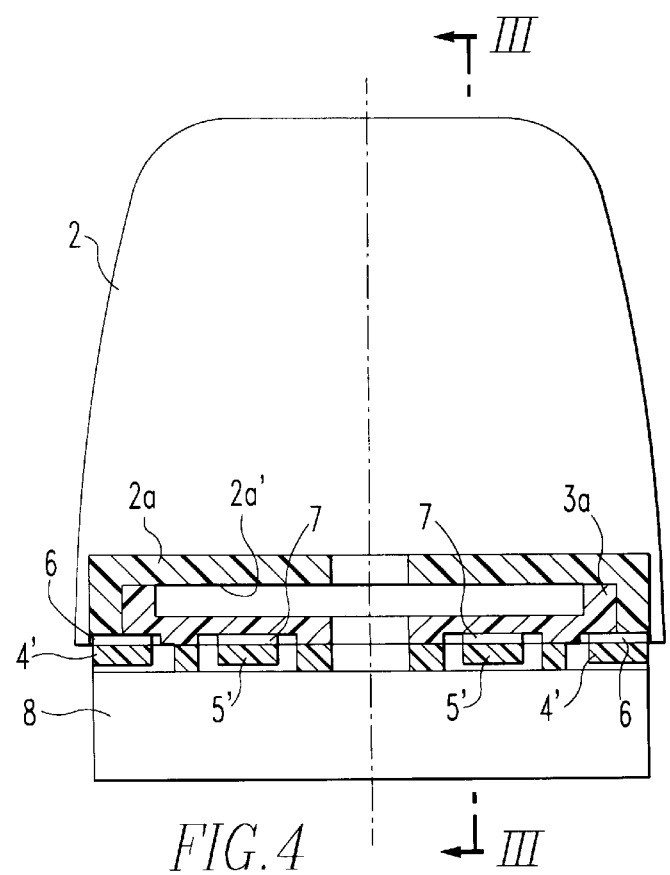
FIG. 4 is a party sectional side view of the clamping wall structures and the insert.

As noted hereinbefore, at least one of the clamping wall structures must be movable. In the preferred embodiment of the invention shown and to be described herein, both clamping wall structures are movable. As seen from FIGS. 2 to 5, the clamping wall structures 2 and 3 are generally L-shaped, each of them including a slide plate 2a or 3a. The slide plate 2a of the clamping wall structure 2 is generally U-shaped in cross-section so as to define a glide channel 2a' in which the slide plate 3a of the clamping wall structure 3 is slideably lodged (see particularly FIGS. 3 and 4). The slide plate 2a of the clamping wall structure 2 has restraining means 6 (FIGS. 2, 4 and 5) disposed on outer surface portions thereof facing away from the bottom of the glide channel 2a'; and the slide plate 3a of clamping wall structure 3 has restraining means 7 (FIGS. 3, 4 and 5) disposed on outer surface portions thereof likewise facing in a direction away from the bottom of the glide channel 3a'. The restraining means 6 and 7 preferably comprise serrations formed on said outer surface portions of the clamping wall structures 2 and 3, respectively.

The base body 1 has installed therein a removable insert 8 (see also FIG. 6) including restraining means 4 and, 5 corresponding to the restraining means 6 and 7, respectively. The insert 8 is removably supported in the bottom part Ia of the base body body 1 in a manner such that the restraining means 4, 5 thereon will coact with the restraining means 6, 7 on the slide plates 2a, 3a of the clamping wall structures 2,3 to exert upon the latter a restraining or motion retarding force which is small enough to allow the clamping wall structures to be moved by hand but which exceeds the force exerted upon the clamping wall structures by the object clamped therebetween. As seen most clearly from FIGS. 5 and 6, the restraining means 4 and 5 associated with the insert 8 and which, preferably, likewise comprise serrations are disposed on flexible finger elements 4' and 5' each having only one end thereof connected to the insert and having the associated restraining means 4 or 5 disposed thereon adjacent its distal end. Preferably, the finger elements are formed integral with the insert.

Figure 5:
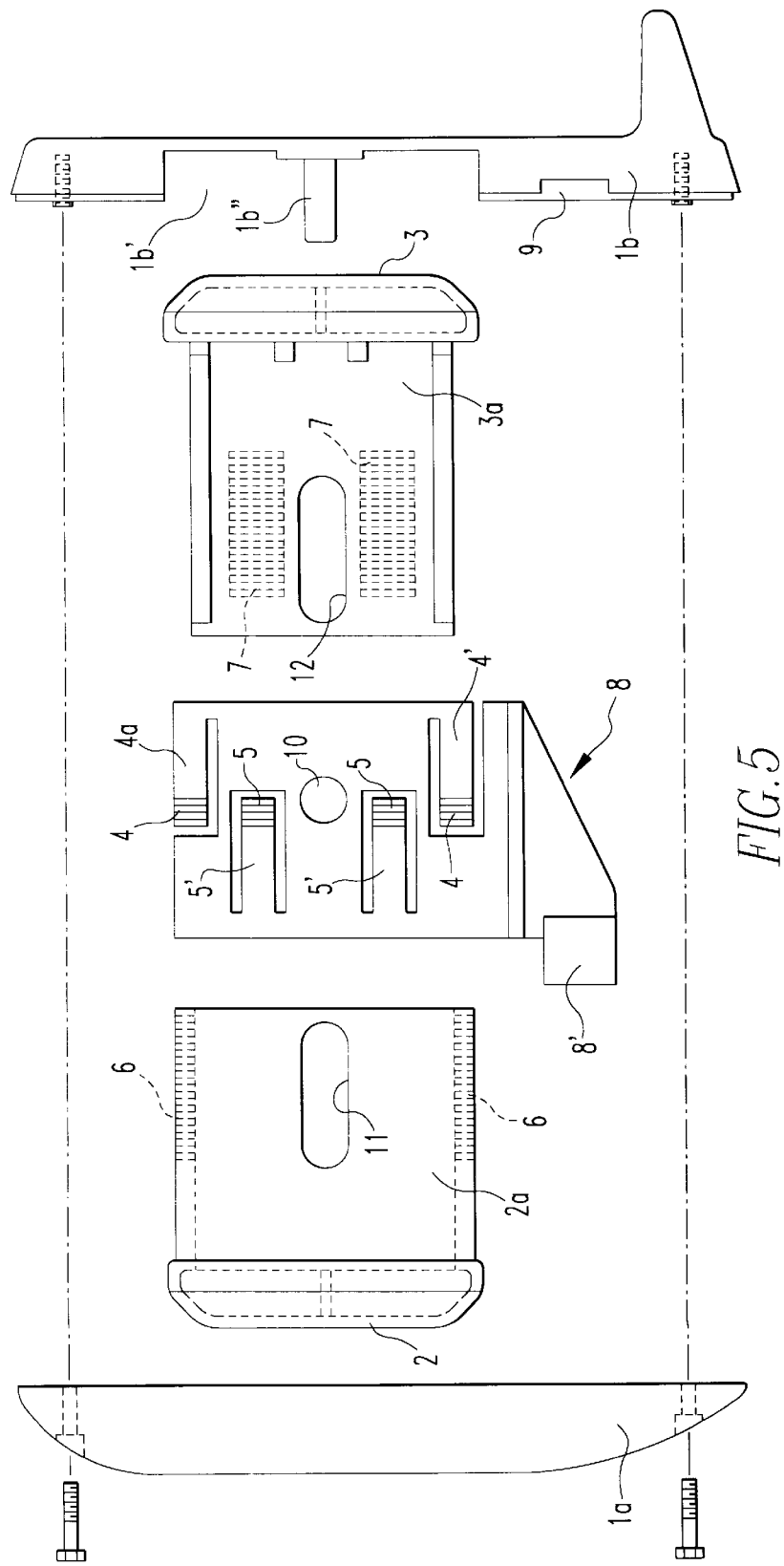
FIG. 5 is an exploded view of the supporting device.
Figure 6:
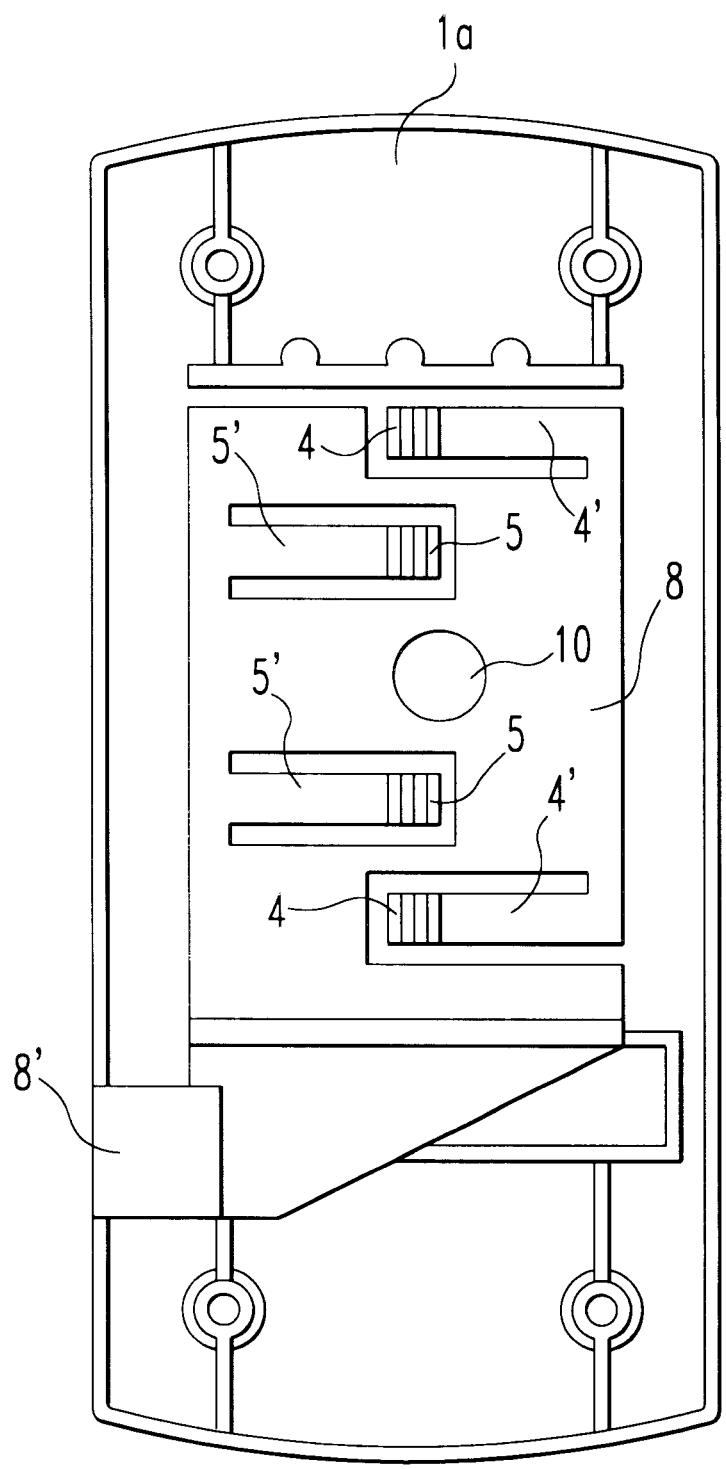
FIG. 6 is a plan view showing the bottom part of the base body together with the insert installed therein.

Likewise as seen best from FIGS. 5 and 6, the insert 8 includes a closure member 8' designed to substantially close a lock-release opening 9 formed in a side-wall portion of the base body 1. As shown, the closure member 8' comprises a substantially rectangular integral portion of the insert 8. Of course, such closure member could be omitted, if desired, for instance in the event the insert is intended never to be used with a base body provided with a lock-release opening.

When all the component parts of the supporting device shown in FIG. 5 are in their assembled position, the insert 8 is seated in the bottom part 1a of the base body 1 (see also FIG. 6), and the slide plates 2a, 3a of the clamping wall structures 2 and 3 extend through recesses 1b' in side wall portions of the cover part 1b and into overlying relationship with the insert 8. A guide pin 1b'' extends through elongated holes 11 and 12 formed in the slide plates 2a and 3a, respectively, and through a circular hole 10 formed in the insert 8 guides the slide plates in their movements so as to ensure that the restraining means 6, 7 thereon will remain properly aligned with the restraining means 4, 5 on the insert 8, and will coact therewith to exert the desired restraining force upon the clamping wall structures 2 and 3. In FIG. 5, the guide pin 1b'' is shown to be supported from the cover part 1b of the base body 1. Alternatively, it could be supported from the bottom part 1a of the base body 1. In either case, the guide pin 1b'' preferably is formed integral with the base-body part 1a or 1b from which it is supported.

What is claimed is:

1. A supporting device for supporting an object, particularly a telephone in a vehicle, comprising a base body, a pair of clamping wall structures supported on said base body and operable to clamp said object therebetween, at least one of said clamping wall structures being movable and guided for movement thereof into and from clamping relationship with the other clamping wall structure, and retaining means for retaining said at least one clamping wall structure in the clamping position to which it is moved, said retaining means comprising first restraining means disposed on said at least one clamping wall structure, and resilient finger elements forming second restraining means mounted on said base body and coacting with said first restraining means in a manner such as to exert upon said at least one clamping wall structure a restraining force permitting manual movement of the latter but which restraining force exceeds the force exerted on the clamping wall structures by the object clamped therebetween.

2. A supporting device according to claim 1, wherein said first and second restraining means comprise serrations arrayed to ride upon each other during movement of said at least one clamping wall structure.

3. A supporting device according to claim 1, including an insert removably supported in said base body and having said resilient finger elements disposed thereon.

4. A supporting device according to claim 3, wherein said finger elements are formed integral with said insert.

5. A supporting device according to claim 1, wherein said base body has an unused opening formed in a wall portion thereof, said insert including a closure member adapted to substantially close said unused opening.

6. A supporting device according to claim 5, wherein said closure member is formed integral with said insert.

7. A supporting device according to claim 1, wherein said at least one clamping wall structure includes a slide plate which is slideably supported on said base body in overlying relationship with respect to said second restraining means.

8. A supporting device according to claim 7, wherein said slide plate has said first restraining means disposed thereon on the side thereof facing said second restraining means.

9. A supporting device according to claim 7, wherein both clamping wall structures are movable, the slide plate of said at least one clamping wall structure defining a glide channel which is open toward said base body, and the other clamping wall structure including a slide plate which is slideably lodged in said glide channel.

10. A supporting device according to claim 9, wherein the slide plate of said at least one clamping wall structure has a first plurality of said first restraining means disposed thereon on the side thereof facing said second restraining means, and the slide plate of the other clamping wall structure has a second plurality of said first restraining means disposed thereon on the side thereof facing said second restraining means.

11. A supporting device according to claim 1, wherein said clamping wall structures have clamping surfaces with elastic pads disposed thereon.

* * * * *